(12) United States Patent
Hollands et al.

(10) Patent No.: US 12,428,137 B2
(45) Date of Patent: Sep. 30, 2025

(54) DRIVE ARRANGEMENTS

(71) Applicant: BAE SYSTEMS PLC, London (GB)

(72) Inventors: Robert David Hollands, Rochester (GB); Martyn Ingleton, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 18/713,481

(22) PCT Filed: Nov. 23, 2022

(86) PCT No.: PCT/GB2022/052960
§ 371 (c)(1),
(2) Date: May 24, 2024

(87) PCT Pub. No.: WO2023/099865
PCT Pub. Date: Jun. 8, 2023

(65) Prior Publication Data
US 2025/0042540 A1    Feb. 6, 2025

(30) Foreign Application Priority Data

Dec. 2, 2021  (EP) ..................................... 21275174
Dec. 2, 2021  (GB) ..................................... 2117385

(51) Int. Cl.
*B64C 13/50*   (2006.01)
*B64C 13/28*   (2006.01)

(52) U.S. Cl.
CPC .......... *B64C 13/505* (2018.01); *B64C 13/341* (2018.01)

(58) Field of Classification Search
CPC ........ F16D 27/14; F16D 28/00; F16D 63/002; B64C 13/505; B64C 13/341; B64C 13/28
See application file for complete search history.

(56) References Cited

U.S. PATENT DOCUMENTS

| | | |
|---|---|---|
| 4,575,027 A | 3/1986 | Cronin |
| 2005/0103928 A1 | 5/2005 | Flatt |
| 2011/0048147 A1* | 3/2011 | Keech .................. F16H 25/205 |
| | | 74/89.26 |
| 2015/0107957 A1 | 4/2015 | Kruk et al. |

FOREIGN PATENT DOCUMENTS

| | | |
|---|---|---|
| DE | 10145236 A1 | 4/2003 |
| EP | 3892536 A2 | 10/2021 |
| JP | S56160299 A | 12/1981 |
| WO | 2023099865 A1 | 6/2023 |

OTHER PUBLICATIONS

International Search Report and Written Opinion received for PCT/GB2022/052960. Mailed: Jan. 20, 2023. 11 pages.
Combined Search and Examination Report under Sections 17 and 18(3) received for GB Application No. 2117385.1 Dated: May 30, 2022. 5 pages.
Extended European Search Report received for EP Application No. 21275174.7. Dated: May 16, 2022. 7 pages.

* cited by examiner

*Primary Examiner* — Timothy Hannon
(74) *Attorney, Agent, or Firm* — Finch & Maloney PLLC (57) ABSTRACT

A drive arrangement for manipulating a vehicle control surface, comprises: a first drive; a second drive; an output member for connecting to the vehicle control surface; first engaging means for selectively engaging and disengaging the first drive and the output member; and second engaging means for selectively engaging and disengaging the second drive and the output member, wherein the first drive and the second drive are mounted on bearings.

20 Claims, 9 Drawing Sheets

DRIVE ARRANGEMENTS

FIELD

The present invention relates to drive arrangements for manipulating vehicle control surfaces, and in particular to drive arrangements which provide redundancy in case of malfunction or failure.

BACKGROUND

Aeroplanes, helicopters and other aircraft have multiple flight control surfaces—such as ailerons, elevators, wing flaps, rudders and rotor blades—which are manipulated during flight (including take-off and landing) to control the aircraft's motion. In many aircraft, the flight control surfaces are manipulated by electromechanical drive arrangements which apply forces to the components of the flight control surfaces to achieve the necessary configurations of the flight control surfaces and thus the desired aircraft motion.

In existing applications, such a drive arrangement may include a single drive (eg an electric motor) in combination with any necessary gearing arrangement and connecting means to transfer force from the single drive to the flight control surfaces. In the event of a drive failure, the drive can be disconnected and/or overridden by a human pilot who assumes manual control.

The present invention aims to provide improvements to such drive arrangements.

SUMMARY

According to an aspect of the present invention, there is provided a drive arrangement for manipulating a vehicle control surface, comprising: a first drive; a second drive; an output member for connecting to the vehicle control surface; first engaging means for selectively engaging and disengaging the first drive and the output member; and second engaging means for selectively engaging and disengaging the second drive and the output member, wherein the first drive and the second drive are mounted on bearings.

Optionally, the first engaging means comprises a first pin and a first actuator configured to extend or retract the first pin to cause engagement or disengagement of the first drive and the output member. In some examples, the second engaging means comprises a second pin and a second actuator configured to extend or retract the second pin to cause engagement or disengagement of the second drive and the output member.

Optionally, the first actuator and the second actuator are configured to cause the first pin to disengage the first drive and the output member, and the second pin to engage the second drive and the output member, substantially simultaneously.

In some examples, the drive arrangement comprises a first torque arm which is rotatably mounted adjacent to the first drive and includes an aperture for receiving the first pin; and a first force sensor configured to measure a force experienced by the first torque arm. The first force sensor may be mechanically grounded, constraining movement of the first force sensor and the first torque arm. The first pin may be configured to constrain the first drive and the first torque arm such that the first drive and the first torque arm are substantially fixed relative to each other.

In some examples, the drive arrangement comprises a second torque arm which is rotatably mounted adjacent to the second drive and includes an aperture for receiving the second pin; and a second force sensor configured to measure a force experienced by the second torque arm. The second force sensor may be mechanically grounded, constraining movement of the second force sensor and the second torque arm. In some examples, the second pin is configured to constrain the second drive and the second torque arm such that the second drive and the second torque arm are substantially fixed relative to each other.

Optionally, the first drive is rotatably mounted within a mechanically grounded first housing on first bearings. The second drive may be rotatably mounted within a mechanically grounded second housing on second bearings.

In some examples, the output member includes a connecting portion configured for connection to the vehicle control surface.

The first engaging means may comprise a shear pin, a break knuckle or another single-use component which is configured to fail under unexpected force or torque conditions to disengage the first drive and output member.

Optionally, the first drive and the second drive are arranged to both be engaged with the output member at the same time, the first drive and the second drive being independently disengageable from the output member to allow the other drive to independently control the output member.

According to another aspect of the invention, there is provided a vehicle comprising a drive arrangement as claimed in any preceding claim.

BRIEF DESCRIPTION OF THE FIGURES

Embodiments of the invention will now be described by way of example only with reference to the figures, in which.

DETAILED DESCRIPTION

The following examples illustrate a variety of different drive arrangements for manipulating vehicle control surfaces. Each of the drive arrangements includes two drives which may be selectively engaged with an output member, for onward connection to a vehicle control surface, providing redundancy in case of drive malfunction or failure. The examples include different mechanisms for selective engagement of the drives with the output member. As will be described in more detail below, the different examples can be combined in multiple ways, including by using a mechanism from one example with a mechanism from another example in a not-illustrated combination, and by combining different drive arrangements to achieve greater redundancy (ie more than one additional drive).

Figure 1:
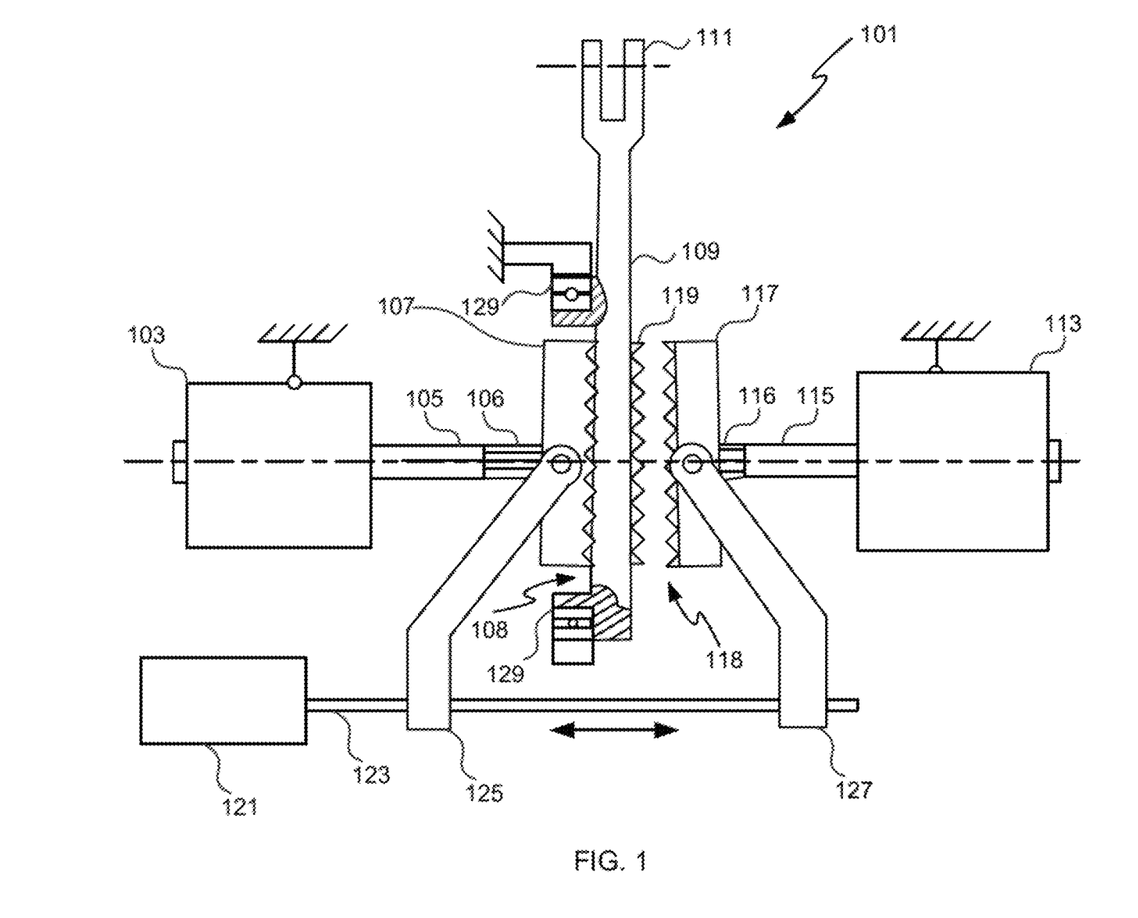
FIG. 1 shows a drive arrangement with two drives which can be selectively engaged with an output member via respective Hirth joints.
Figure 2:
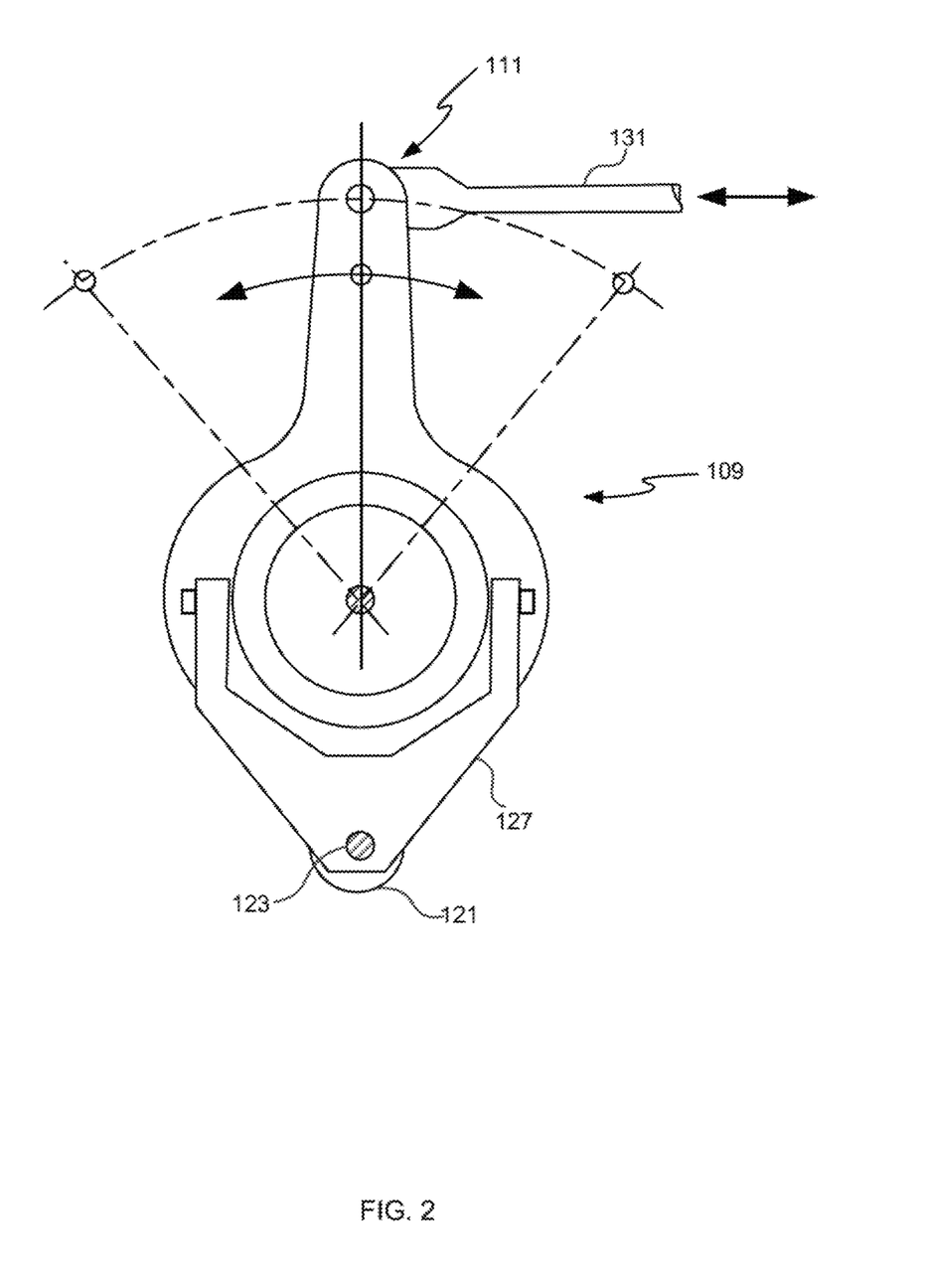
FIG. 2 shows part of the drive arrangement of FIG. 1.

FIG. 1 shows a first example of a drive arrangement 101 comprising a first drive 103 with an output shaft 105 connected to a first side 107 of a first Hirth joint 108. In FIG. 1, the first side 107 of the first Hirth joint 108 is meshed with the second side of the first Hirth joint 108. The second side of the first Hirth joint 108 is mounted on or formed as part of an output member 109, which is rotatably mounted on bearings 129. Rotation of the output shaft 105 by the first drive 103 therefore causes rotation of the output member 109, since the rotation is transferred between the meshed sides of the first Hirth joint 108. The output member 109 has a connecting portion 111 at its upper end to connect the output member 109 to other components (eg a connector 131 as illustrated in FIG. 2) to allow the movement of the output member 109 to be transferred to a vehicle control surface.

The drive arrangement 101 also includes a second drive 113 (which in the illustrated example is the same as the first drive 103). The second drive 113 includes an output shaft 115 which is connected to the first side 117 of a second Hirth joint 118.

In FIG. 1, the first side 117 of the second Hirth joint 118 is not meshed with the second side 119 of the second Hirth joint 118. However, an actuator 121 is configured to disengage the first and second sides of the first Hirth joint 108 by retracting a rod 123 which connects the actuator 121 to a first arm 125 that is connected to the first side 107 of the first Hirth joint 108. Retracting the rod 123 also brings the first side 117 of the second Hirth joint 118 into engagement with the second side 119 of the second Hirth joint 118 by moving a second arm 127 which is connected to the rod 123 and to the first side 117 of the second Hirth joint 118. This allows the second drive 113 to take over responsibility for driving the output member 109. The actuator 121 may cause this transfer of responsibility to take place if first drive 103 malfunctions (eg seizes or stops providing the intended rotational output in terms of torque or speed), allowing normal operations to continue under the action of second drive 113. This may furthermore allow the selective use of the different drives 103, 113 (which may have different respective parameters, eg different torque profiles) at different times, to optimise the functioning of the corresponding vehicle control surface.

In the illustrated example, the output shafts 105, 115 include respective splined sections 106, 116 which engage with corresponding splined apertures in the first side 107 of the first Hirth joint 108 and the first side 117 of the second Hirth joint 118, to allow transfer of rotational motion from the output shafts 105, 115 to the first sides 107, 117 and also the necessary axial motion of the first sides 107, 117 along the output shafts 105, 115 for engagement and disengagement of the first and second Hirth joints 108, 118. In other examples, alternative couplings may be provided instead of the splined sections 106, 116, such as flexure links that allow free translation along the link shafts but provide stiff torque coupling. The double-headed arrow in FIG. 1 indicates the directions of movement of the rod 123 and the first sides 107, 117 of the Hirth joints 108, 118 to achieve the engagement and disengagement of the first sides 107, 117 with their respective second sides (which are axially stationary, ie do not move in the axial direction).

Multiple instances of the drive arrangement 101 illustrated in FIG. 1 could be connected to a common shaft (eg via the respective connecting portions 111 of their output members 109) to allow additional redundancy (ie where a single drive arrangement as illustrated in FIG. 1 provides one redundant drive, two drive arrangements 101 coupled as described to a common shaft would provide three redundant drives).

FIG. 2 shows an axial view of the second arm 127, the output member 109 and a connector 131 connected to the output member 109 at the connecting portion 111. Dashed straight lines demarcate the range of orientations the central axis of the output member 109 may take, under the action of the first and second drives 103, 113. A dashed curved line illustrates the path swept through by the end of the connector 131 which is connected to the output member 109 at the connecting portion 111. This movement of the connector 131 may be used to manipulate a vehicle control surface, either directly or via one or more additional connections or linkages to convert the connector 131's motion into the necessary kind of motion for the corresponding vehicle control surface.

Figure 3:
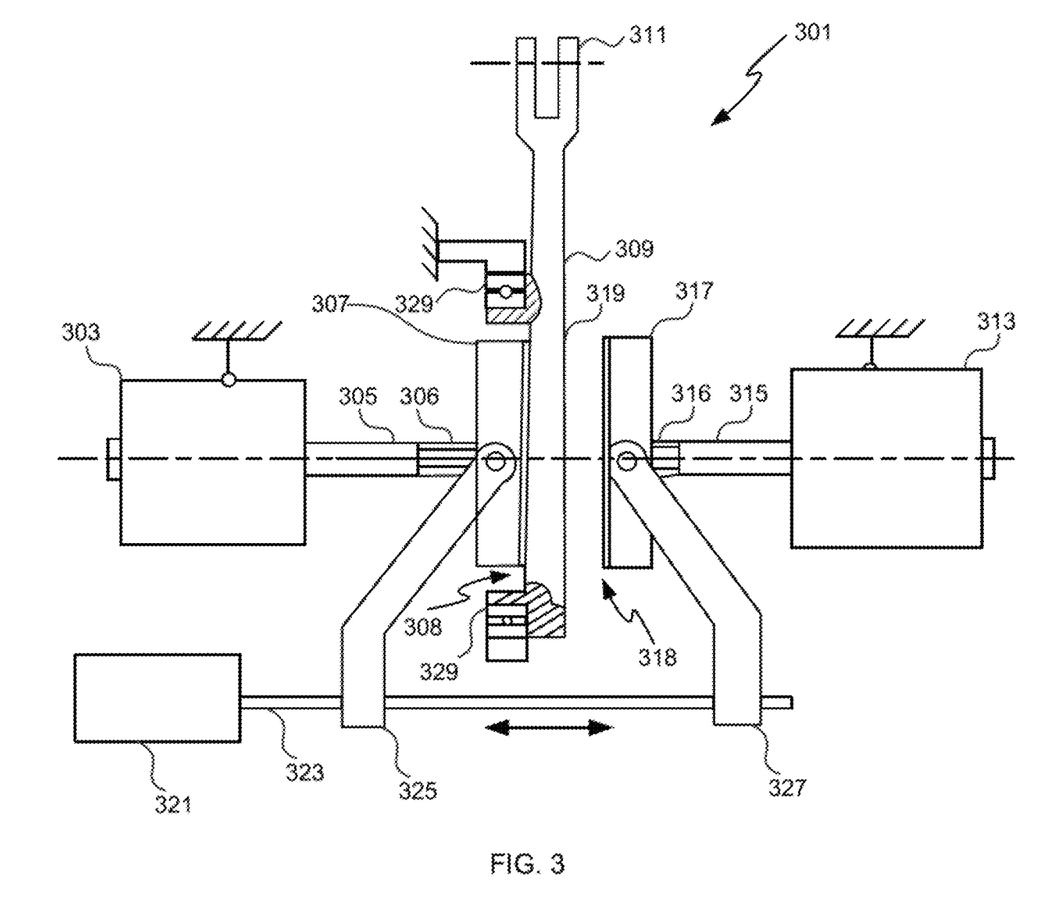
FIG. 3 shows a drive arrangement with two drives which can be selectively engaged with an output member via respective friction clutches.

FIG. 3 illustrates a further example of a drive arrangement 301. In this example, instead of Hirth joints 108, 118 there are friction clutches 308, 318 with respective first clutch plates 307, 317 and second clutch plates 319. The operation of drive arrangement 301 is substantially similar to that of drive arrangement 101. First drive 303 rotates output shaft 305, which causes rotation (via splined section 306) of first side 307 of first friction clutch 308. In the configuration illustrated in FIG. 3, the first side 307 of first friction clutch 308 is engaged with the second side of the first friction clutch 308, which is mounted on or formed as part of output member 309. Rotation from first drive 303 can therefore be passed to output member 309, which is rotatably mounted in bearings 329.

If first drive 303 fails, actuator 321 can retract rod 323, causing arms 325 and 327 to move to the left in FIG. 3. This disengages first friction clutch 308 by separating first side 307 from the second side of the first friction clutch 308. At the same time, second friction clutch 318 is engaged, as first side 317 of second friction clutch 318 engages with second side 319 of second friction clutch 318 by virtue of the leftward movement of the rod 323 and arm 327. Thereafter, when second drive 313 rotates output shaft 315, rotation is caused (via splined section 316) of engaged first and second sides 317, 319 of second friction clutch 318, causing rotation of output member 309.

As in the example of FIG. 1, output member 309 includes a connection portion 311 at which the output member 309 may be connected to a further component, such as the connector 131 illustrated in FIG. 2.

As with the drive arrangement 101 of FIG. 1, multiple instances of the drive arrangement 301 illustrated in FIG. 3 could be connected to a common shaft (eg via the respective connecting portions 311 of their output members 309) to allow additional redundancy (ie where a single drive arrangement as illustrated in FIG. 3 provides one redundant drive, two drive arrangements 301 coupled as described to a common shaft would provide three redundant drives).

The examples in FIGS. 1 and 3 are clutch-based examples, involving axial movement (along the drive output axes) of the first sides 107, 117, 307, 317 to engage and disengage the respective drives 103, 113, 303, 313 and the output members 109, 309. The Hirth joints 108, 118 and the friction clutches 308, 318 are disengaged/engaged (respectively) substantially simultaneously under the action of the corresponding actuators 121, 321, rods 321, 323 and arms 125, 127, 325, 327. The rods 321, 323 and arms 125, 127, 325, 327 also move axially (parallel to the drive output axes).

In FIGS. 1 and 3, the actuators 121, 321, rods 123, 323 and arms 125, 127, 325, 327 also rotate with the output members 109, 309 about the axes shown in dashed lines in the figures.

Figure 4:
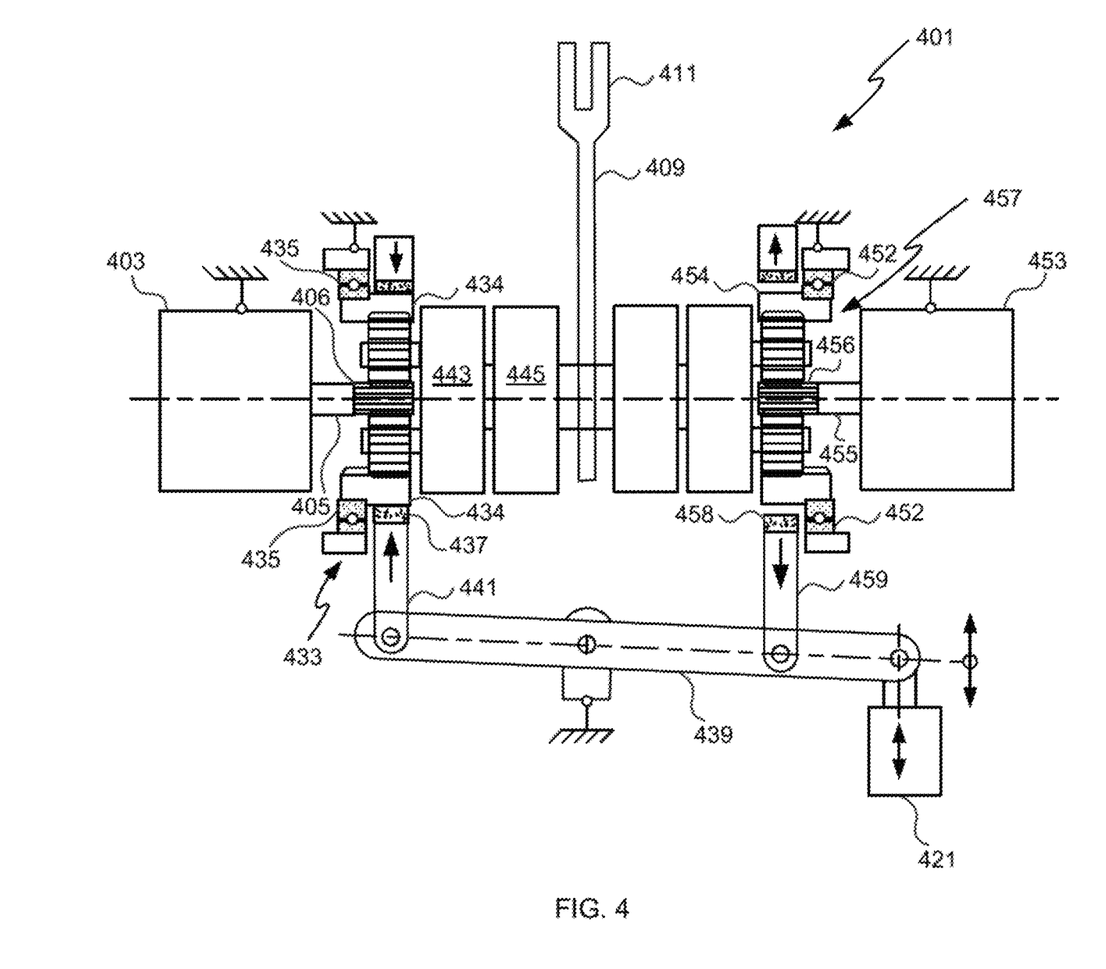
FIG. 4 shows a drive arrangement with two drives which can be selectively engaged with an output member via respective epicyclic gearboxes.

FIG. 4 shows another example of a drive arrangement 401, comprising a first drive 403 with an output shaft 405 connected to or forming at least part of the "sun" gear of a first epicyclic or planetary gearbox 433 (illustrated splined section 406 may act as the sun gear). The "ring" gear 434 of the first epicyclic gearbox 433 is trunnion mounted in bearings 435 which allow the ring gear 434 to rotate around the shaft 405. First friction material 437 is provided adjacent to the ring gear 434. Under the action of actuator 421, rod 439 acts as a rocker, pushing first arm 441 upwards and bringing first friction material 437 into contact with the ring gear 434 to prevent the ring gear 434 from rotating within bearings 435. This allows drive to be transferred from first drive 403 through the first epicyclic gearbox 433 downstream towards output member 409. Drive may be transferred from the first epicyclic gearbox 433 to one or more intervening components, such as the illustrated additional epicyclic gearboxes 443 and 445. The multiple epicyclic gearboxes 433, 443, 445 may cooperate to provide a range of output speeds and torques to the output member 409 using the output from the first drive 403. The first friction material 437 may be provided as blocks (eg resembling brake blocks), as a band extending around a significant portion of the ring gear 434's circumference (eg resembling a brake band) or in another form. Actuating the actuator 421 pivots the rocker 439, which moves the first arm 441 closer to or further away from the ring gear 434 and thus the first friction material 437 into or out of contact with the ring gear 434, depending on the direction of actuation. This enables selective engagement or disengagement of the first drive 403 with the output member 409 by holding or releasing the ring gear as appropriate.

The drive arrangement 401 includes a similar set of components on the opposite side of the output member 409. A second drive 453 is provided, with an output shaft 455 connected to or forming at least part of the sun gear of second epicyclic gearbox 457 (illustrated splined section 456 may act as the sun gear). The ring gear 454 of the second epicyclic gearbox 457 is also trunnion mounted in respective bearings 452 which allow the ring gear 454 to rotate around the shaft 455. Second friction material 458 is provided adjacent to the ring gear 454. The action of the actuator 421, the rocker 439 and second arm 459 causes the second friction material 458 to come out of or into contact with the ring gear 454 to allow or prevent rotation of the ring gear 454, thus controlling whether drive is transferred from second drive 453 to output member 409. Analogously to the examples illustrated in FIG. 1 and FIG. 3, the rocking motion of the rod 439 under the action of actuator 421 enables the substantially simultaneous engagement of one drive 403, 453 and disengagement of the other drive 453, 403.

In the example drive arrangement 401 shown in FIG. 4, the actuator 421, rocker 439 and arms 441 do not rotate around the dashed axis of the drive arrangement 401.

As with the drive arrangements 101, 301 of FIGS. 1 and 3, multiple instances of the drive arrangement 401 illustrated in FIG. 4 could be connected to a common shaft (eg via the respective connecting portions 411 of their output members 409) to allow additional redundancy (ie where a single drive arrangement as illustrated in FIG. 4 provides one redundant drive, two drive arrangements 401 coupled as described to a common shaft would provide three redundant drives).

In the illustrated example, the friction material 437, 456, arms 441, 459, and other engagement/disengagement components are provided around first and second epicyclic gearboxes 433, 457 (which are the first epicyclic gearboxes downstream from first and second drives 403, 453, respectively) to engage and disengage drives 403, 453 and output member 409. This may advantageously mean that wear caused during engagement/disengagement is minimised, since the torque output at the first and second epicyclic gearboxes 433, 457 may be expected to be lower than the torque output at the downstream epicyclic gearboxes 443, 445, etc, and therefore the torque change during engagement/disengagement is lower, leading to less stress and wear on the components. However, the engagement/disengagement components could alternatively be provided around the downstream epicyclic gearboxes 443, 445, etc with the same ability to engage/disengage drives 403, 453 and output member 409. For example, arm 441, friction material 437 and bearing 435 could be provided around epicyclic gearbox 443 to allow drive through epicyclic gearbox 443 to be engaged and disengaged. In that case, the corresponding epicyclic gearbox on the opposite site of output member 409 (the second epicyclic gearbox downstream from drive 453) may have arm 459, friction material 456 and provided bearing 452 around it to effect disengagement/engagement of second drive 453 and output member 409. However, in some instances it may be preferable for different epicyclic gearboxes to be engaged/disengaged on either side of the output member 409 (eg the first epicyclic gearbox downstream from one drive and the third epicyclic gearbox downstream from the other drive), and this may be achieved by appropriate configuration of the actuator 421, rod 439 and other components, or in other ways, such as by the replacement of those components with independent actuators for the two epicyclic gearboxes either side of output member 409. Such a configuration may be particularly advantageous in arrangements where the sets of epicyclic gearboxes on either side of output member 409 are arranged to provide different, complementary torque ratios from each other, and swapping from one drive to the other therefore allows access to a different range of torque outputs.

Figure 5:
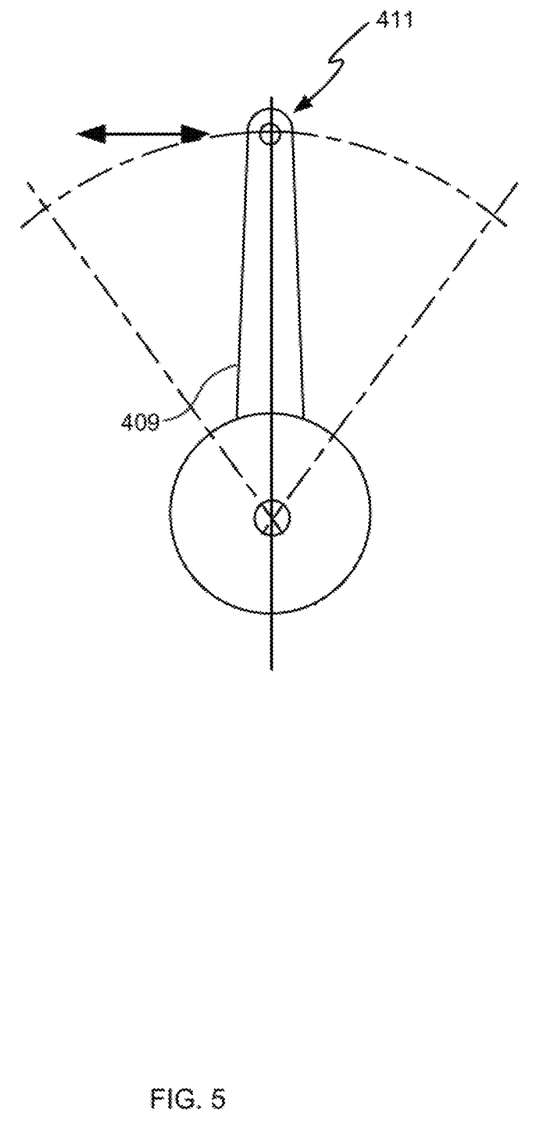
FIG. 5 shows the output member of the drive arrangement of FIG. 4.

FIG. 5 shows a side, axial view of the output member 409 of the example illustrated in FIG. 4. Analogously to the output member 109 illustrated in FIG. 2, the output member 409 can move through a range of orientations (again demarcated by dashed lines in the figure). As in FIG. 2, a connector can be attached to the output member 409 at the connecting portion 411. Also as in FIG. 2, the corresponding movement of the connector may be used to manipulate a vehicle control surface.

Figure 6:
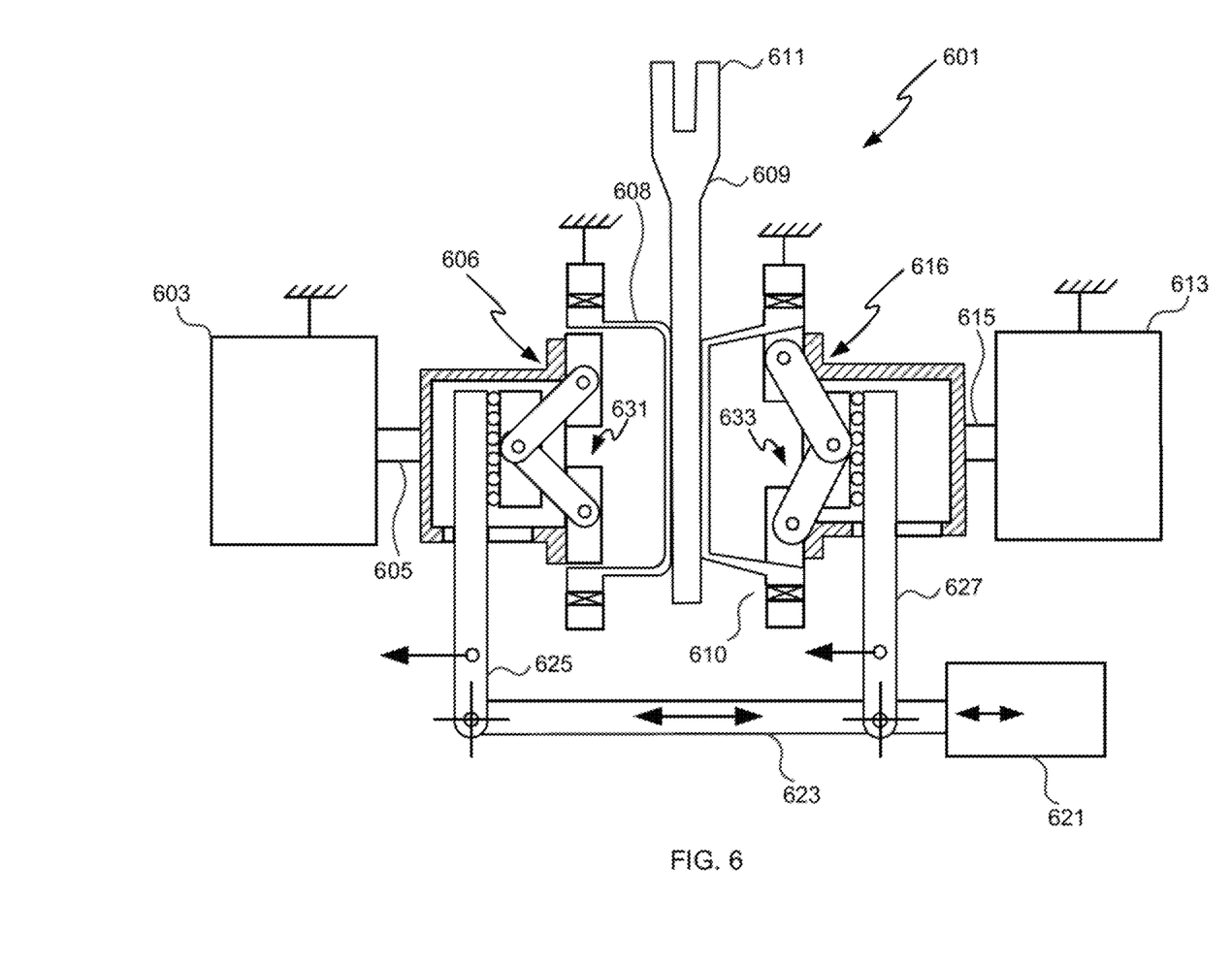
FIG. 6 shows a drive arrangement with two drives which can be selectively engaged with an output member via respective strain wave-type gearboxes.

FIG. 6 illustrates another example of a drive arrangement 601, comprising a first drive 603 with an output shaft 605 which is connected to an input (not shown) of a first strain wave-type gearbox 606. An output component 608 of the first strain wave-type gearbox 606 is connected to an output member 609 like the output members 109 and 409 in FIGS. 1 and 4. The drive arrangement 601 also includes a second drive 613 with an output shaft 615 which is connected to an input (not shown) of a second strain wave-type gearbox 616.

An output component 610 of the second strain wave-type gearbox 616 is connected to the output member 609.

Figure 7:
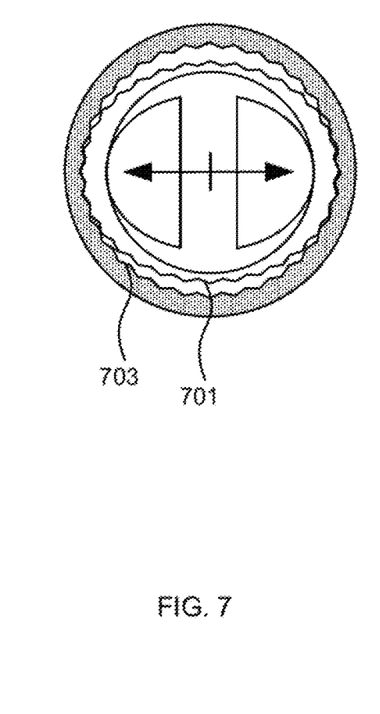
FIG. 7 shows a wave generator of a strain wave-type gearbox in an extended, elongate configuration to engage an inner flex spline and an outer circular spline of the strain wave-type gearbox.
Figure 8:
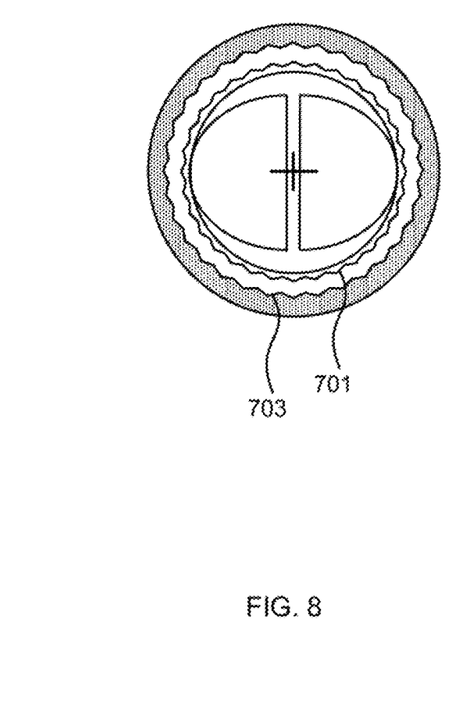
FIG. 8 shows a wave generator of a strain wave-type gearbox in a retracted, shortened configuration to disengage an inner flex spline and an outer circular spline of the strain wave-type gearbox.

As shown in FIG. 6, the first strain wave-type gearbox 606 includes a first mechanism 631 which acts as the wave generator component of the first strain wave-type gearbox 616 and is moveable between the configurations illustrated in FIGS. 7 and 8. In the configuration illustrated in FIG. 7, the wave generator is elliptical or oval in shape with an extended or elongated major axis, deforming the flex spline component 701 of the strain-wave type gearbox 606 and forcing the gear teeth of the flex spline component 701 into contact with the gear teeth of the outer circular spline component 703 of the strain-wave type gearbox 606 at the major axis vertices of the ellipse. In the configuration illustrated in FIG. 8, the major axis of the wave generator is shorter, meaning the shape of the wave generator is closer to a circle and the gear teeth of the flex spline component 701 are not engaged with the gear teeth of the outer circular spline component 703. By moving the wave generator component between these configurations, the first drive 603 can be engaged with and disengaged from the output member 609. With reference to FIGS. 6, 7 and 8, the wave generator of the first strain wave-type gearbox 606 is provided by hinged mechanism 631, the outer circular spline component 703 of the first strain wave-type gearbox 606 is provided by ring 635, and the flex spline component 701 of the first strain wave-type gearbox 606 is provided by output component 608.

The drive arrangement 601 includes a similar set of components on the opposite side of the output member 609. A second drive 613 is provided, with an output shaft 615. Also provided are a second strain wave-type gearbox 616 including a second mechanism 633 which acts as the wave generator component of the second strain wave-type gearbox 616. An output component 610 of the second strain wave-type gearbox 616 is connected to the output member 609.

As shown in the lower part of FIG. 6, an actuator 621 is provided which causes movement of the first and second mechanisms 631, 633 via a rod 623 and connecting arms 625, 627 which act to move the mechanisms 631, 633 between the extended and contracted configurations shown in FIGS. 7 and 8. Analogously to the previous examples, the engagement and disengagement of the first and second strain wave-type gearboxes 606, 616 by the actuator 621, rod 623 and arms 625, 627 occurs substantially simultaneously. Specifically, as the actuator 621 moves the rod 623 to the left (into the configuration shown in FIG. 6), arm 625 pulls the illustrated hinge of mechanism 631 into the more angled configuration shown, reducing the outer diameter of the wave generator defined by the mechanism 631 and thereby disengaging first drive 603 from output member 609. At the same time, the leftward movement of the rod 623 and the arm 627 pushes the illustrated hinge of mechanism 633 into the flatter configuration shown, increasing the outer diameter of the wave generator defined by the mechanism 633 and thereby engaging second drive 613 with output member 609. When the actuator 621 instead moves the rod 623 to the right, the reverse happens, resulting in the first drive 603 being engaged with the output member 609 and the second drive 605 being disengaged from the output member 609.

The not-shown inputs of the strain wave-type gearboxes 606, 616 connect the output shafts 605, 615 of first and second drives 603, 613 to the first and second mechanisms 631, 633 to transfer rotation from the output shafts 605, 615 to the first and second mechanisms 631, 633. The inputs may for example be splined shafts as illustrated in the previous examples, each with a non-splined section of shaft extending through arm 625, 627, respectively, such that arm 625, 627 can slide axially along the shaft, and with the splined portions of the shafts positioned to engage with a corresponding splined aperture in the left-hand block of hinged mechanism 631 and right-hand block of hinged mechanism 633, respectively, at least when the respective hinged mechanism 631, 633 is in the configuration illustrated in FIG. 7 and discussed in more detail below. The inputs of the strain wave-type gearboxes 606, 616 therefore act to transfer rotation to hinged mechanisms 631, 633. Other forms of input, such as a flexure link or another component or set of components for transferring rotation from the output shafts 605, 615 to the hinged mechanisms 631, 633, are also possible.

As with the previous drive arrangements 101, 301 and 401, multiple instances of the drive arrangement 601 illustrated in FIG. 6 could be connected to a common shaft (eg via the respective connecting portions 611 of their output members 609) to allow additional redundancy (ie where a single drive arrangement as illustrated in FIG. 6 provides one redundant drive, two drive arrangements 601 coupled as described to a common shaft would provide three redundant drives).

Figure 9:
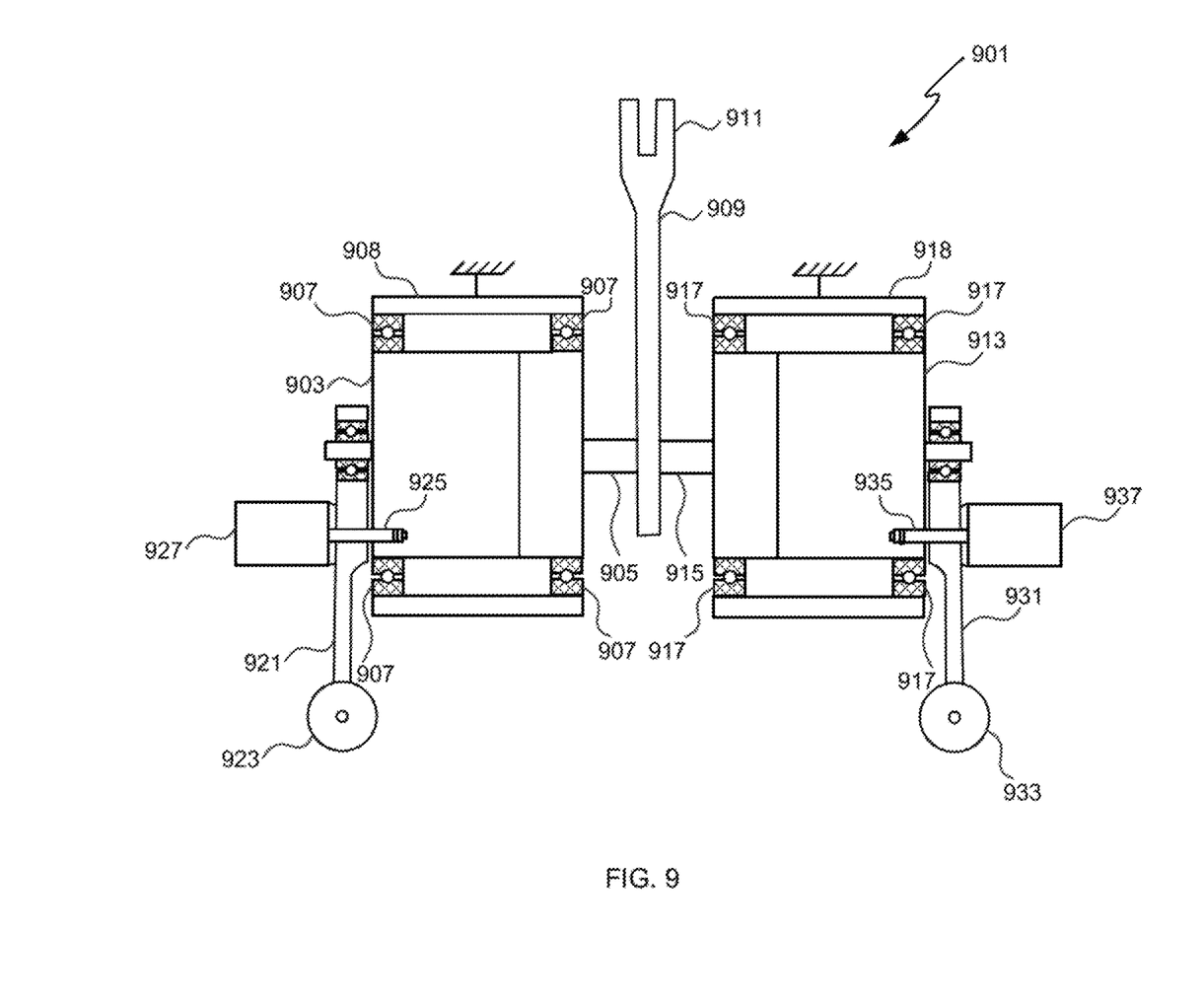
FIG. 9 shows a drive arrangement with two drives which can be selectively engaged with an output member by virtue of respective torque arms and retractable couplings.

FIG. 9 shows another example of a drive arrangement 901, comprising a first drive 903 with an output shaft 905 connected to an output member 909. The first drive 903 is trunnion mounted on bearings 907 such that first drive 903 can rotate on the bearings within a first housing 908. A first torque arm 921 is also trunnion mounted around the same axis of rotation as the first drive 903. The first torque arm 921 is releasably connected to the first drive 903 such that the first drive 903 and the first torque arm 921 rotate together when connected and can rotate relative to each other when the releasable connection is removed. In the illustrated example, the releasable connection is provided by a first pin 925 which is controlled by a first actuator 927. With the first pin 925 in the illustrated position, the first drive 903 and the first torque arm 921 rotate together. If the first actuator 927 retracts the first pin 925 out of the first drive 903, the first drive 903 and the first torque arm 921 are free to rotate independently. A first sensor 923 monitors a force or torque experienced by the first torque arm 921. If the first sensor 923 measures an abnormal force/torque, indicating that the first drive 903 is malfunctioning, the first sensor 923 may instruct or cause instruction of the first actuator 927 to retract the first pin 925. Retracting the first pin 925 means that the first drive 903 is no longer constrained by the first torque arm 921, and so may rotate freely within its trunnion bearings 907, no longer providing an output to output shaft 905 (and thus output member 909), since it no longer has a resistance to act against.

The drive arrangement 901 includes a similar set of components on the opposite side of the output member 909. Drive arrangement 901 includes a second drive 913 with an output shaft 915 connected to the output member 909. Like first drive 903, second drive 913 is trunnion mounted on bearings 917 such that second drive 913 can rotate on the bearings 917 within a second housing 918. A second torque arm 931 is also trunnion mounted around the same axis of rotation as the second drive 913. The second torque arm 931 is releasably connected to the second drive 913 such that the second drive 913 and the second torque arm 931 rotate together when connected and can rotate relative to each other when the releasable connection is removed. In the illustrated example, the releasable connection is provided by a second pin 935 which is controlled by a second actuator 937. With the second pin 935 in the illustrated position, the second drive 913 and the second torque arm 931 rotate together. If the second actuator 937 retracts the second pin 935 out of the second drive 913, the second drive 913 and the second torque arm 931 are free to rotate independently. A second sensor 933 monitors a force or torque experienced by the second torque arm 931. If the second sensor 933 measures an abnormal force/torque, indicating that the second drive 913 is malfunctioning, the second sensor 933 may instruct or cause instruction of the second actuator 937 to retract the second pin 935. Retracting the second pin 935 means that the second drive 913 rotates freely within its trunnion bearings 917 and does not provide any output to output shaft 905 (and thus output member 909), since it no longer has a resistance to act against.

The drive arrangement 901 therefore allows either the first drive 903 or the second drive 913 to selectively provide output to the output member 909, by selectively disconnecting the first drive 903 or the second drive 913 from its corresponding torque arm 921, 931, meaning that the output of the disconnected drive 903, 913 is not directed to the output member 909 and the disconnected drive 903, 913 is instead free to rotate in its trunnion bearings 907, 917. The other drive can then provide output to the output member 909 as desired.

As with the previously described drive arrangements 101, 301, 401, 601, multiple instances of the drive arrangement 901 illustrated in FIG. 9 could be connected to a common shaft (eg via the respective connecting portions 911 of their output members 909) to allow additional redundancy (ie where a single drive arrangement as illustrated in FIG. 9 provides one redundant drive, two drive arrangements 901 coupled as described to a common shaft would provide three redundant drives).

Figure 10:
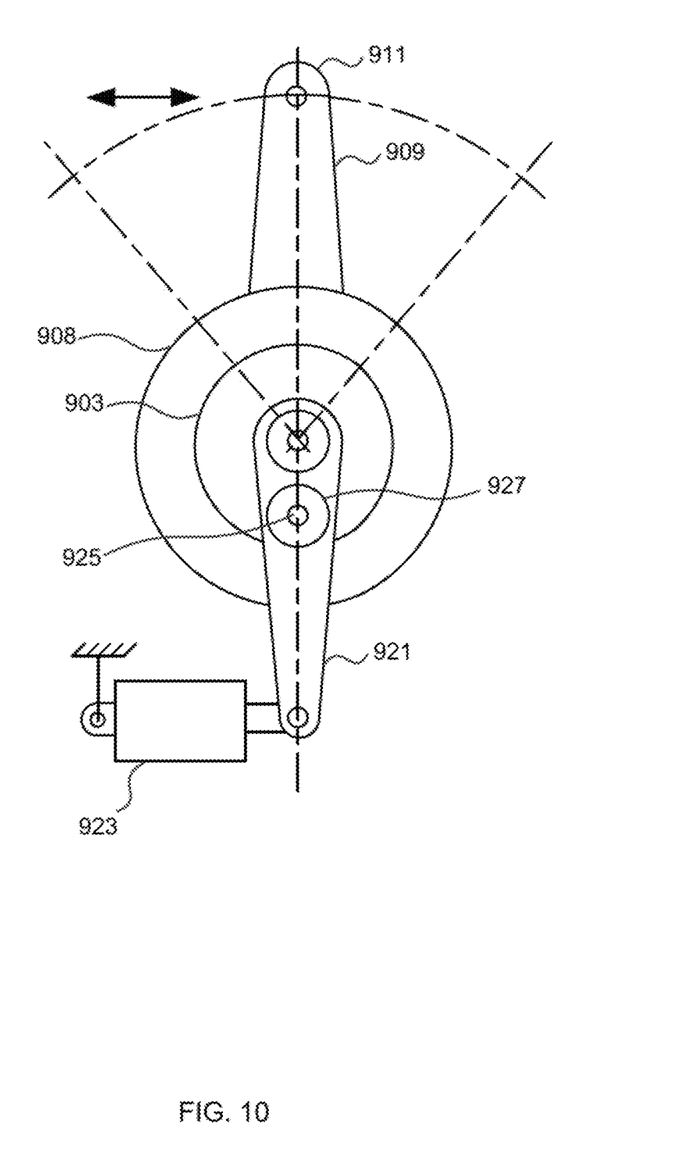
FIG. 10 shows part of the drive arrangement of FIG. 9.

FIG. 10 illustrates the drive arrangement 901 of FIG. 9 in axial (end-on) view, taken from the left in FIG. 9, with the first actuator 927, the first sensor 923, the first torque arm 921, the first drive 903, the first housing 908 and the output member 909 visible. As can be seen from FIG. 10, the first sensor 923 is mechanically grounded to provide the resistance against which the first drive 903 can push when the first drive 903 is connected to the first torque arm 921 via the first pin 925.

Although in the context of FIGS. 9 and 10, pins 925, 935 have been described as being actuatable by actuators 927, 937, in other examples shear pins, break knuckles or other single-use components may be provided which are designed to fail under unexpected force/torque conditions. This may advantageously reduce the size and cost of the drive arrangement 901 by dispensing with the actuators but still providing the desired outcome of decoupling a malfunctioning drive 903, 913 from its respective torque arm 921, 931 to disengage the malfunctioning drive 903, 913 from the output member 909. The remaining drive 913, 903, still engaged by virtue of its own pin 935, 925 being intact, can then provide the required drive to the output member 909 and any vehicle control surfaces attached thereto.

Each drive 103, 113, 303, 313, 403, 453, 603, 613, 903 and 913 may be a motor alone or may be a combination of a motor and a gearing arrangement, depending on the specific scenario and the desired output. For example, the drives 103 and 113 illustrated in FIG. 1 may preferably be paired combinations of motors and gearing arrangements (each combination represented as a single "drive"), since there are no other gearing arrangements (eg gearboxes) illustrated between the drives 103, 113 and the output member 109. Including gearing arrangements within the drives 103, 113 may therefore be necessary to achieve the desired output rotation speed, torque and/or other parameters at the output member 109. By contrast, the drives 403 and 453 illustrated in FIG. 4 may be motors only, since gearboxes 433, 443, 445, etc are provided between the drives 403, 453 and the output member 409. Those gearboxes 433, 443, 445 can be configured to achieve the desired output parameters for the output member 409.

Any of the described, illustrated and claimed drive arrangements may be provided with one or more torque monitoring sensors which are configured to measure the torque provided by the drives, to monitor for spikes, sudden drops or other torque abnormalities which indicate drive malfunction or failure. The data collected by the sensor(s) may be used to determine when to actuate an actuator (such as the illustrated actuators 121, 321, 421, 621, 927, 937) to cause disengagement of a drive which a sensor indicates is malfunctioning and engagement of another drive instead. The data collected by the sensor(s) may also be used to determine what torque the drive which is about to take over from another drive needs to apply in order to smooth the transition between drives.

The torque monitoring sensors (or additional sensors) may monitor how far a given drive and/or the output member to which the drive is connected has rotated. This may enable another drive in the drive arrangement to make sure it is pre-aligned with the output member when it attempts to engage with the output member to take over responsibility for driving the output member. This may be particularly important for the Hirth joints 108, 118 shown in FIG. 1, where accurate alignment of the teeth or tips of the sides 107, 117, 119 of the Hirth joints may be crucial for preventing damage or blocking when the sides attempt to engage.

Any of the described, illustrated and claimed drive arrangements may include one or more controllers which are configured to control the overall operation of the drive arrangements or their subcomponents. For example, the controller(s) may control the drive(s) 103, 113, etc to ensure the drives provide the required outputs. The controller(s) may also receive data from the above-described sensor(s) and use the data to determine when to actuate the above-described actuator(s). The controller(s) may furthermore receive data from other sources, such as a computer, joystick, pedal, handheld wireless controller or other input device which is providing instructions relating to the intended motion of the vehicle in which the drive arrangement is installed. The controller may comprise one or more processors, which can be implemented using a general or special-purpose processing engine such as, for example, a microprocessor, microcontroller or other control module. The controller may be accompanied by one or more computer-readable storage media on which may be provided instructions for controlling the drive arrangement. The controller may also be accompanied by a communications interface. Such a communications interface can be used to allow software and data to be transferred between the controller and an external device, such as the computer, joystick, pedal, handheld wireless controller or other input device mentioned above.

The output members 109, 309, 409, 609 and 909 may be crank arms or levers which can be connected to a crankshaft or other component(s) to convert the angular rotation of the connecting portions 111, 311, 411, 611 and 911 of the output members into a different type of motion, or to transfer the angular rotation to the necessary component(s).

The term "engage" (and, mutatis mutandis, "disengage") as used in this document in relation to the relationship between a drive and an output member includes the possibilities of establishing a complete physical, mechanical connection between the drive and the output member where previously there was no complete connection (eg as in the drive arrangements 101 and 301 of FIGS. 1 and 3, where the Hirth joints 108, 118 and friction clutches 308, 318 make and break mechanical connections between the drives 103, 113, 303, 313 and the output members 109, 309), as well other changes which result in it being possible to transmit force from the drive to the output member where previously it was not possible to transmit force from the drive to the output member. For example, in the drive arrangement 901 illustrated in FIG. 9, the output shaft 905 of first drive 903 and the output shaft 915 of second drive 913 are at all times connected to the output member 909, so there always exist complete physical, mechanical connections between the first and second drives 903, 913 and the output member 909. However, because of the trunnion mounting of the drives 903, 913 on bearings 907, 917, it is not possible to transmit force from either of the drives 903, 913 to the output member 909 unless the respective pin 925, 935 is in the position shown in FIG. 9, constraining the rotation of the drives 903, 913 within the bearings 907, 917 by virtue of the mechanical grounding of the sensors 923, 933 to which the torque arms 921, 931 are connected.

The term "mechanically grounded" as used in this document indicates that the referred-to component is attached to a locally static component such as a housing of an aircraft or other vehicle in which the drive arrangement is implemented, thereby preventing movement of the referred-to component relative to that locally static component. Where it helps the reader to understand the motions and interactions of the different components, mechanical grounding is indicated in the figures (see the "antenna"-like symbol on drives 103, 113 in FIG. 1, for instance). As an example, in FIGS. 1 and 3, the drives 103, 113, 303, 313 are mechanically grounded, meaning that they do not rotate relative to the vehicle body or other component on which they are mounted. Similarly, the bearings 129, 329 on which the output members 109, 309 are mounted are also mechanically grounded. However, the actuators 121, 321 and the connected rods 123, 323 and arms 125, 127, 325, 327 are not mechanically grounded, meaning that they are able to rotate around the illustrated (dashed) axes as the drives 103, 113, 303, 313 cause rotation of the first sides 107, 117, 307, 317 to which the actuators 121, 321 are attached via the arms 125, 127, 325, 327 and rods 123, 323.

The drive arrangement 901 of FIG. 9 is illustrated with two sensors 923, 933—one per drive-torque arm combination—for maximum flexibility, but in some versions of that drive arrangement only a single sensor 923 may be provided. For example, in some versions, the first drive 903 may be regarded as the "primary" drive which is expected to be responsible for driving the output member 909 during normal operation. The second drive 913 may be regarded as a "secondary" drive which is expected to take over temporarily if the primary drive fails. In such versions, the secondary drive 913 may not have a sensor, since it may be expected that the primary drive 903 will re-assume responsibility for driving the output member 909 as soon as it is able to (eg after it has been reset or, if necessary, repaired or replaced), and so the secondary drive may not be expected to need monitoring since it should only be responsible for driving the output member 909 for a short time. Having only a single sensor may advantageously reduce the cost and weight of the drive arrangement 901, as well as the space consumed by drive arrangement.

Although the illustrated examples use the same two engaging means on either side of the respective output members 109, 309, 409, 609, 909 (ie two Hirth joints 107, 117 are used in FIG. 1, two friction clutches 307, 317 are used in FIG. 3, etc), it is possible to mix different engaging means if desired. For example, a Hirth joint as illustrated in FIG. 1 could be used in conjunction with a friction clutch as illustrated in FIG. 3 or a strain wave-type gearbox as illustrated in FIG. 6. Some non-matching pairings (such as the Hirth joint and the friction clutch or strain wave-type gearbox mentioned above) can still be simultaneously engaged and disengaged (and vice versa) by a single actuator. Alternatively, separate actuators may be provided, depending on the desired drive arrangement performance characteristics.

Although in several of the drive arrangements only a single actuator is provided, in some embodiments a separate actuator may be provided for each drive in a drive arrangement (eg as illustrated in FIG. 9). This allows greater flexibility of timing about when a given drive is engaged or disengaged. For instance, it may be desirable for both drives in a drive arrangement to be connected during normal operation, with one drive actively driving and the other drive idly following the first (ie being back-driven by the first), without providing any significant assistance or resistance, such that, if the driving drive fails, the driving drive can be disengaged by its corresponding actuator, and the previously idling/back-driven drive can be switched into driving mode. This can also be extended where there are two or more redundant drives.

The described, illustrated and claimed drive arrangements are suitable for manipulating control surfaces in any kinds of vehicle which include control surfaces. For example, the drive arrangements may be used with aerial vehicles, such as aeroplanes, helicopters, autogyros, drones (unmanned aerial vehicles), gliders and others, and also with other types of vehicle, such as boats and submarines (eg to control rudders or other surfaces which influence vessel motion). The drive arrangements may be particularly advantageous for use with drones and other unmanned vehicles, since the redundancy provided by the drive arrangements allows for continued operation of an unmanned vehicle even if one of the drives fails-another drive can take over instead of a human, for example. However, the drive arrangements are equally suitable for use in manned vehicles, where they may provide an automated, backup or failover control solution if the pilot/driver of the vehicle cannot or chooses not to continue controlling the vehicle. The manned vehicle may therefore include additional components by means of which the pilot/driver can control the vehicle. This may be a separate arrangement of components which allow the pilot/driver to control the vehicle control surface(s) independently of the described, illustrated and claimed drive arrangements, or an arrangement by means of which the pilot/driver can control one or both of the drives of a drive arrangement in order to control the vehicle control surface(s) via the drive arrangement. The vehicle may include means for detecting when the pilot/driver is no longer controlling the vehicle and automatically causing the described, illustrated and claimed drive arrangements to take over control. Additionally or alternatively, the vehicle may include means for allowing the driver to cause the drive arrangements to take over control.

The invention claimed is:

1. A drive arrangement for manipulating a vehicle control surface, comprising:
   a first drive;
   a second drive;
   an output member for connecting the first drive and the second drive to the vehicle control surface;
   a torque arm rotatably mounted adjacent to the first drive;
   a force sensor configured to measure a force experienced by the torque arm; and
   engaging means for selectively engaging or disengaging the first drive and the torque arm;
   wherein the first drive and the second drive are mounted on bearings.

2. The drive arrangement of claim 1, wherein the engaging means comprises:
   a pin; and
   an actuator configured to extend or retract the pin to cause engagement or disengagement of the first drive and the torque arm.

3. The drive arrangement of claim 2, wherein:
   the torque arm includes an aperture for receiving the pin.

4. The drive arrangement of claim 3, wherein the force sensor is mechanically grounded, constraining movement of the force sensor and the torque arm.

5. The drive arrangement of claim 3, wherein the pin is configured to constrain the first drive and the torque arm such that the first drive and the torque arm are substantially fixed relative to each other.

6. The drive arrangement of claim 1, wherein the torque arm is a first torque arm, the force sensor is a first force sensor, and the engaging means is a first engaging means, the drive arrangement comprising:
   a second torque arm rotatably mounted adjacent to the second drive;
   a second force sensor configured to measure a force experienced by the second torque arm; and
   a second engaging means for selectively engaging or disengaging the second drive and the second torque arm.

7. The drive arrangement of claim 6, wherein the pin is a first pin and the actuator is a first actuator, and the second engaging means comprises:
   a second pin; and
   a second actuator configured to extend or retract the second pin to cause engagement or disengagement of the second drive and the second torque arm.

8. The drive arrangement of claim 7, wherein the first actuator and the second actuator are configured to cause the first pin to disengage the first drive and the torque arm, and the second pin to engage the second drive and the torque arm, substantially simultaneously.

9. The drive arrangement of claim 7, wherein the second torque arm includes an aperture for receiving the second pin, and wherein the second force sensor is mechanically grounded, constraining movement of the second force sensor and the second torque arm.

10. The drive arrangement of claim 7, wherein the second pin is configured to constrain the second drive and the second torque arm such that the second drive and the second torque arm are substantially fixed relative to each other.

11. The drive arrangement of claim 1, wherein the first drive is rotatably mounted within a mechanically grounded housing on first bearings included in the bearings.

12. The drive arrangement of claim 11, wherein the housing is a first housing, and the second drive is rotatably mounted within a mechanically grounded second housing on second bearings included in the bearings.

13. The drive arrangement of claim 1, wherein the output member includes a connecting portion configured for connection to the vehicle control surface.

14. The drive arrangement of claim 1, wherein the first engaging means comprises a shear pin, a break knuckle, or a single-use component which is configured to fail under unexpected force or torque conditions, to disengage the first drive and the torque arm.

15. The drive arrangement of claim 1, wherein the first drive and the second drive are arranged to both be engaged with the output member at the same time, the first drive and the second drive being independently disengageable from the output member to allow the other drive to independently control the output member.

16. A vehicle comprising a drive arrangement of claim 1.

17. A drive arrangement for manipulating a vehicle control surface, comprising:
   a first drive mounted on first bearings;
   a second drive mounted on second bearings;
   an output member for connecting the first drive and the second drive to the vehicle control surface;
   a first torque arm rotatably mounted adjacent to the first drive;
   a first force sensor configured to measure a force experienced by the first torque arm;
   a second torque arm rotatably mounted adjacent to the second drive;
   a second force sensor configured to measure a force experienced by the second torque arm;
   a first component for selectively engaging or disengaging the first drive and the first torque arm, the first component including a first pin and a first actuator, the first actuator configured to extend or retract the first pin to cause engagement or disengagement of the first drive and the first torque arm; and
   a second component for selectively engaging or disengaging the second drive and the second torque arm, the second component including a second pin and a second actuator, the second actuator configured to extend or retract the second pin to cause engagement or disengagement of the second drive and the second torque arm.

18. The drive arrangement of claim 17, wherein the first drive and the second drive are arranged to both be engaged with the first torque arm and the second torque arm, respectively, at the same time, the first drive and the second drive being independently disengageable from the first torque arm and the second torque arm, respectively, to allow the other drive to independently control the output member.

19. A drive arrangement for manipulating a vehicle control surface, comprising:
   a first drive mounted on first bearings;
   a second drive mounted on second bearings;
   an output member for connecting the first drive and the second drive to the vehicle control surface;
   a first component for selectively disengaging the first drive and a first torque arm, the first component including a shear pin, a break knuckle, or a component that is configured to fail or disengage under unexpected force or torque conditions, to disengage the first drive and first torque arm; and
   a second component for selectively disengaging the second drive and the second torque arm, the second component including a shear pin, a break knuckle, or a component that is configured to fail or disengage under unexpected force or torque conditions, to disengage the second drive and second torque arm.

20. The drive arrangement of claim 19, wherein the first drive and the second drive are arranged to both be engaged with the first torque arm and the second torque arm, respectively, at the same time, the first drive and the second drive being independently disengageable from the first torque arm and the second torque arm, respectively, to allow the other drive to independently control the output member.

* * * * *